United States Patent
Wang et al.

(10) Patent No.: US 10,345,046 B2
(45) Date of Patent: Jul. 9, 2019

(54) FAULT DIAGNOSIS DEVICE BASED ON COMMON INFORMATION AND SPECIAL INFORMATION OF RUNNING VIDEO INFORMATION FOR ELECTRIC-ARC FURNACE AND METHOD THEREOF

(71) Applicant: Northeastern University, Shenyang, Liaoning (CN)

(72) Inventors: Zhenbang Wang, Liaoning (CN); Yingwei Zhang, Liaoning (CN); Lin Feng, Liaoning (CN)

(73) Assignee: Northeastern University, Shenyang, Liaoning (CN)

( * ) Notice: Subject to any disclaimer, the term of this patent is extended or adjusted under 35 U.S.C. 154(b) by 79 days.

(21) Appl. No.: 15/605,427

(22) Filed: May 25, 2017

(65) Prior Publication Data

US 2017/0261264 A1    Sep. 14, 2017

(51) Int. Cl.
| | |
|---|---|
| *F27D 21/00* | (2006.01) |
| *H04N 7/18* | (2006.01) |
| *G01M 3/38* | (2006.01) |
| *G06K 9/00* | (2006.01) |
| *G06K 9/62* | (2006.01) |
| *G06T 7/00* | (2017.01) |

(Continued)

(52) U.S. Cl.
CPC .......... *F27D 21/0021* (2013.01); *F27D 11/08* (2013.01); *G01M 3/38* (2013.01); *G06K 9/00718* (2013.01); *G06K 9/00751* (2013.01); *G06K 9/00771* (2013.01); *G06T 7/001* (2013.01); *G06T 7/13* (2017.01); *G06T 7/40* (2013.01); *G06T 7/90* (2017.01); *H04N 7/181* (2013.01); *F27D 2021/0085* (2013.01); *F27D 2021/026* (2013.01); *G06K 9/6212* (2013.01); *G06K 2009/00738* (2013.01); *G06T 2207/10024* (2013.01); *G06T 2207/30232* (2013.01)

(58) Field of Classification Search
None
See application file for complete search history.

(56) References Cited

U.S. PATENT DOCUMENTS 5,249,954 A * 10/1993 Allen ...................... F23N 5/082
348/83
2006/0017821 A1 * 1/2006 Garvey, III ............. H04N 5/77
348/231.3

(Continued)

*Primary Examiner* — Reza Aghevli

(57) ABSTRACT

A fault diagnosis method for an electrical fused magnesia furnace includes steps of: 1) arranging six cameras; 2) obtaining video information by the six cameras and sending the video information to a control center; then analyzing the video information by a chip of the control center; wherein a multi-view-based fault diagnosis method is used by the chip, comprising steps of: 2-1) comparing a difference between two consecutive frame histograms for shots segmentation; 2-2) computing a set of characteristic values for each shot obtained by the step 2-1), and then computing color, texture, and motion vector information; finally, evaluating shot importance via entropy; 2-3) clustering shots together by calculating similarity; 2-4) generating and optimizing a multi-view video summarization with a multi-objective optimization model; and 2-5) providing fault detection and diagnosis; and 3) displaying results of the fault detection and diagnosis on a host computer inter face of the control center.

11 Claims, 9 Drawing Sheets

(51) Int. Cl.
*G06T 7/13* (2017.01)
*G06T 7/40* (2017.01)
*G06T 7/90* (2017.01)
*F27D 11/08* (2006.01)
*F27D 21/02* (2006.01)

(56) References Cited

U.S. PATENT DOCUMENTS

2014/0132419 A1\* 5/2014 Schumann ............... G08B 5/36
  340/815.45
2015/0273580 A1\* 10/2015 Prabhu ................... B22D 33/00
  164/4.1

\* cited by examiner

I: Impurity area
II: Equiaxed crystal area
III: Columnar crystal area
IV: Leather sand Layer area ① Raw material layer
② Smelting layer
③ Crystal cooling layer

FAULT DIAGNOSIS DEVICE BASED ON COMMON INFORMATION AND SPECIAL INFORMATION OF RUNNING VIDEO INFORMATION FOR ELECTRIC-ARC FURNACE AND METHOD THEREOF

BACKGROUND OF THE PRESENT INVENTION

Field of Invention

The present invention relates to a technical field of process monitoring of an industrial process, and more particularly to a fault diagnosis device based on common information and special information of running video information for an electric-arc furnace and a method thereof.

Description of Related Arts

Nowadays, process monitoring of multivariate statistical methods has become more and more mature. However, with the diversification and large scale of process variables, process monitoring becomes more and more complex. Especially after the video and audio data reflecting more and more abundant information, fault detection and diagnosis is facing enormous challenges.

Roughly speaking, different scholars from different angles, different classifications are made for the process monitoring method with the research deepening of fault detection and diagnosis methods. Professor Frank P. M. divides the process monitoring method into three categories: analytical model-based approach, qualitative knowledge-based approach and signal-based approach. However, with the deepening of research and the cross between disciplines deeper and deeper, such as the introduction of principal component analysis (PCA), independent component analysis (ICA) and other statistical theory, the multivariable statistical method based on data has been widely used in process monitoring and has shown a powerful advantage in the field of fault detection and diagnosis. Due to the data-based essence of multivariable statistical process monitoring, it is relatively easy to apply real processes of rather large scale, in comparison with other methods based on systems theory or rigorous process models. Therefore, fault monitoring methods based on data-driven will be listed as the fourth effective means by some scholars in the field of process monitoring.

The PCA method is used to extract useful information in multivariate process data in order to detect and identify various faults in the metallurgical and chemical industry. Wise BM et al. are the first to use PCA method in the field of process monitoring. Since then PCA as one of the basic methods of process monitoring makes multivariate statistical methods cut a figure in the application to fault detection and diagnosis. On the basis of PCA using in the field of fault detection and diagnosis, fault identification and fault reconstruction based on multivariate statistical methods have also flourished. However, in some cases, there are often dependencies between the two sets of multiple correlation variables in practical problems. This requires an effective method to model these two sets of variables reasonably. Thus, the partial least squares (PLS) method that could achieve the regression model of two sets of related variables came into being in 1983. After that, PLS is applied to process monitoring in order to deal well with the relationship between process variables and quality variables in the chemical industry. In addition, PCA and PLS methods are only suitable for the Gaussian process. So then, for non-Gaussian process, ICA plays an important role in extracting non-Gaussian variable information, which can make full use of the high-order statistics information from process data. Kano et al. applied ICA theory to fault diagnosis firstly, and meanwhile process monitoring method based on ICA was presented. Subsequently, in order to solve the serious non-linear problems in the complex process industry, the kernel theory was used to form the KPCA, KPLS and KICA in the above multivariate statistical methods. They can demonstrate good performance in actual process monitoring.

Unfortunately, the above multivariate statistical method cannot show satisfactory fault detection results for video information of large data age compared to fault detection and diagnosis of traditional process variables. Multi-view video summarization is a good way to deal with large-scale video data, which opened the way to use video data for process monitoring. Video summarization technology is a summary of the original video content. By the analysis of the original video and key shots extraction, we can select meaningful video content to compose the compact video summarization. A good video summarization allows the user to obtain the maximum amount of information from the original video sequence in a minimum amount of time. Most of the traditional video summarization techniques are just for the single-view video. But with the development of video surveillance system, more and more video is multi-view video, and the scene contents are captured by different video cameras which often have similarity or dissimilarity, so the use of multi-view video summarization for fault detection and diagnosis has a great advantage. Furthermore, the multi-view video summarization technology provides a new idea for us to deal with multi-batch processes and long-running short-cycle reciprocating process problems.

In the research field which bases on the data of complex industrial process abnormal condition diagnosis and its applications, as shown in FIG. 1, three kinds of works are always exist, which are abnormal condition detection, abnormal condition isolation and abnormal condition identification respectively. The main objectives of these three works are whether there are faults, where the faults exist, estimating the kinds of faults (known faults or unknown faults), and then identify the known fault belongs to which kind of faults. Therefore, the abnormal condition detection works have plenty of research characteristics, such as complex evolution of fault caused by complex conditions, widely spreading of fault leaded by strong coupling of variables, and the weakening feature of fault as a result of multi-source interference. Because of these characteristics, three technical challenges have emerged, which are the difficulty of real-time detection, the difficulty of accurate isolation, and the difficulty of precise identification, separately. The background of this research is mainly based on the process of smelting and recrystallization of EFMF, which is a complex and variable strong coupling process. Besides, once the corresponding fault occurs in the period of industrial production, there will be a lot of unpredictable losses and risks, if a timely alarm or diagnosis cannot be given. Hence, in order to solve the problems as mentioned before, a data driven fault diagnosis approach based on multi-view will be applied to monitor the smelting process of EFMF by using the video information. And then we will introduce the fault diagnosis device based on multi-view method.

SUMMARY OF THE PRESENT INVENTION

An object of the present invention is to provide a fault diagnosis device based on common information and special information of running video information for an electric-arc furnace, which overcomes defects of conventional technologies, wherein the electric-arc furnace is an electrical fused magnesia furnace.

Another object of the present invention is to provide a fault diagnosis method based on common information and special information of running video information for an electric-arc furnace, which overcomes defects of conventional technologies, wherein the electric-arc furnace is an electrical fused magnesia furnace.

Accordingly, in order to accomplish the above objects, the present invention provides a fault diagnosis device for an EFMF (electrical fused magnesia furnace), comprising:

six cameras, wherein three of the six cameras are respectively arranged at relative positions of three electrodes above a surface layer of the EFMF and aim at the electrodes of the EFMF, so as to monitor a furnace eruption fault; rest of the six cameras are symmetrically arranged around a furnace body by a 120 degree difference and aim at the furnace body, so as to monitor occurrence of a furnace leaking fault; and a control center connected to the six cameras, wherein video information obtained by the six cameras is collected into the control center and analyzed by a chip of the control center; analyzed data are displayed on a host computer inter face of the control center, wherein the six cameras are applied to monitor on a furnace surface and a furnace body according to a multi-view idea, so as to detect, diagnose and identify furnace eruption fault and furnace leaking fault well through the common information and the special information extracted.

Preferably, the cameras are CCD (charge-coupled device) cameras.

Preferably, a multi-view-based fault diagnosis method used for analyzing the video information is stored in the chip of the control center.

The present invention also provides a fault diagnosis method based on common information and special information of running video information for an EFMF, comprising steps of:

1) arranging six cameras, wherein three of the six cameras are respectively arranged at relative positions of three electrodes above the EFMF and aim at the electrodes of the EFMF, so as to monitor a furnace eruption fault; rest of the six cameras are symmetrically arranged around a furnace body by a 120 degree difference and aim at the furnace body, so as to monitor occurrence of a furnace leaking fault;

2) obtaining video information by the six cameras and sending the video information to a control center; then analyzing the video information by a chip of the control center; wherein in order to simplify a difficulty of analysis and improve a real-time performance of video data analysis, multi-view video summarization technology is introduced, so that industrial process monitoring based on running video information is able to be realized; specifically, a multi-view-based fault diagnosis method is used by the chip, comprising steps of:

2-1) comparing a difference between two consecutive frame histograms for shots segmentation;

2-2) computing a set of characteristic values for each shot obtained by the step 2-1), and then computing color, texture, and motion vector information; finally, evaluating shot importance via entropy;

2-3) clustering shots together by calculating similarity, wherein calculation of the similarity of the shots comprises the similarity of the shots in a mono-view and correlation of the shots in different views;

2-4) generating and optimizing a multi-view video summarization with a multi-objective optimization model; wherein the shot in the shot cluster is either reserved or abandoned so as to obtain the multi-view video summarization with a less number and a shorter length of the shots but contains more fully video information; and 2-5) providing fault detection and diagnosis; and 3) displaying results of the fault detection and diagnosis on a host computer inter face of the control center.

Preferably, the step 2-2) specifically comprises a step of computing the color information by a color histogram;

wherein an HSV (hue, saturation and value) color space is used to obtain color histogram information, so as to describe color entropy, wherein:

for a frame f with N color values, a probability of appearance of a $i^{th}$ color value in an image is $P_i$, thus the color entropy is defined as:

$$E_{HSV}(f) = \sum_{i=1}^{N} p_i \log(1/p_i) \tag{1}$$

wherein $\Sigma_{i=1}^{N} p_i = 1$ and $p_i \geq 0$.

Preferably, the step 2-2) specifically comprises a step of computing the texture information by an edge direction histogram;

wherein texture features are extracted using edge direction histogram descriptor; a sobel operator is selected to calculate an edge direction of each pixel; an image space is separated by four lines: horizontal, vertical, 45°, and 135°, in such a manner that the image is divided into eight bins on a center point of the image; then an edge direction information is gathered and an edge direction histogram is obtained; information entropy $E_{EDGE}(f)$ is calculated based on the edge direction histogram of each frame.

Preferably, the step 2-2) specifically comprises a step of computing the motion vector information by a motion-related feature vector;

wherein $V(t,k)$ is used to represent a $k^{th}$ bin grey value of the color histogram of a frame t, where $0 \leq k \leq 127$; a motion-related feature vector is represented by a histogram difference between the frame t and a previous frame t−1, which is determined as $$V(\Delta t, k) = |V(t, k) - V(t-1, k)| \tag{2}$$

$$E_{motion} = \sum_{k=1}^{127} p\{k \mid V(\Delta t, k)\} \log \frac{1}{\{k \mid V(\Delta t, k)\}}. \tag{3}$$

Preferably, the step 2-2) specifically comprises a step of evaluating the shot importance via the entropy;

wherein an entropy fusion model is applied to deal with the entropy, and different weights ω are chosen to merger of different types of the entropy:

$$E_{com}(f) = \omega_1 E_{HSV}(f) + \omega_2 E_{edge}(f) + \omega_3 E_{motion}(f) \tag{4}$$

wherein $\omega_i$ meets: $\omega_1 + \omega_2 + \omega_3 = 1$;

thus an important frame set is obtained:

$$F_{imp}(\text{Video}) = \{f_{i1}, f_{i2}, \ldots, f_{in}\} \tag{5}$$

then an entropy score of each frame is obtained; wherein the entropy with a high score is defined by a threshold to retain, which indicates important frames; a definition of the entropy score is as follows:

$$\gamma = \frac{E_i(f) - \min E_i(f)}{\max E_i(f) - \min E_i(f)} \geq \text{Threshold} \quad (6)$$

wherein $\gamma$ is the entropy score and the threshold is customized according to user requirements, and a range value of the threshold is in an interval [0,1]; $E_i(f)$ represents the entropy of the $i^{th}$ frame, $\max E_i(f)$ and $\min E_i(f)$ represent a maximum value and a minimum value of all entropy separately; the frame whose values are greater than the threshold is retained;

finally, important shots $S_{imp}$ are defined as follows:

$$S_{imp} = Int(f_{i1}, f_{i2}, \ldots, f_{i\alpha}) \quad (7)$$

wherein $Int(\cdot)$ is an integration operation to combine the important frames of a same shot, so as to obtain the important shots.

Preferably, in the step 2-3), the similarity of the shots in the mono-view is measured by two indexes: a temporal adjacency and a visual similarity; specifically, the temporal adjacency refers that two shots are likely to reflect a same event, which is defined as:

$$d_T(T_i, T_j) = \alpha_1 + \alpha_2 |T_i - T_j| + \alpha_3 |T_i - T_j|^2 \quad (8)$$

wherein $T_i$ and $T_j$ respectively denote a time of middle frames of the $i^{th}$ and $j^{th}$ shots along a time axis in a same view. $\alpha_1$, $\alpha_2$ and $\alpha_3$ are control coefficients;

wherein correlation of the shots are measured by the color histogram and the edge direction histogram; a further Euclidean distance is used to measure a difference between two color histograms and two edge direction histograms separately; if k is the $k^{th}$ bin of the histogram, then:

$$d_H(H_i, H_j) = \sqrt{\sum_{k=0}^{n} (H_i(k) - H_j(k))^2} \quad (9)$$

$$d_G(G_i, G_j) = \sqrt{\sum_{k=0}^{m} (G_i(k) - G_j(k))^2} \quad (10)$$

wherein $H_i(k)$ and $H_j(k)$, respectively, denote the color histogram of the $k^{th}$ bin in the $i^{th}$ and $j^{th}$ frame, $H_i(k) - H_j(k)$ denotes a difference of the color histogram between the two corresponding bins k; and $G_i(k)$, $G_j(k)$ denote the edge direction histogram of the $k^{th}$ bin in the $i^{th}$ and $j^{th}$ frame respectively, $G_i(k) - G_j(k)$ denote a difference of the edge direction histogram between the two corresponding bins k;

finally, the temporal adjacency and the visual similarity are combined to obtain the similarity of the shots under the same view, namely:

$$\text{Diff}(i, j) = \gamma_1 d_T(T_i, T_j) + \gamma_2 d_H(H_i, H_j) + \gamma_3 d_G(G_i, G_j) \quad (11)$$

$$\text{MonoSim}(i, j) = e^{-\frac{\text{Diff}(i,j)^2}{2\sigma^2}} \quad (12)$$

wherein, $\gamma_1, \gamma_2, \gamma_3$ are regularization parameters.

Preferably, in the step 2-3), the correlation of the shots in the different views is measured by a principle component analysis-scale invariant feature transform (PCA-SIFT) algorithm;

wherein n frames are randomly selected from each of the similar shots in each view for PCA-SIFT detection; through the feature vector generated by key points in each frame, the descriptor of each frame is obtained, and then the Euclidean distance d of the feature vector is considered as a similarity determination measure between the two frames to obtain a correlation degree of the shots under the different views; assuming that V is a selected shot in one view and S is a shot to be compared in another view, thus the distance between the two shots is be measured by:

$$d(S, V) = \frac{1}{n} \sum_{i=1}^{n} \min_{f_i \in V, g \in S} [d(f_i, g)] \quad (13)$$

wherein n is a number of frames in V; g and $f_i$ are frames from S and V respectively;

the correlation of the shots in the different views is transformed into a problem to find a shot $\overline{S}$ with minimum Euclidean distance between the feature vectors:

$$\overline{S} = \arg\min_{S} [d(S, V)] \quad (14)$$

thus the correlation of shots in the different views is defined as follows:

$$\text{MultiSim}(S, V) = e^{-\frac{d(S,V)^2}{2\sigma^2}} \quad (15)$$

finally, the similar shot are gathered to form a similar shot cluster, wherein the similar shot cluster is finished by a K-means clustering algorithm.

Preferably, in the step 2-4), a given decision vector $x = (x_1, x_2, \ldots, x_n)$ is provided, which meets:

$$x_i = \begin{cases} 1, & \text{shot } i \text{ is reserved} \\ 0, & \text{shot } i \text{ is not reserved} \end{cases} \quad (16)$$

a multi-objective optimization function is given by $$\max UV \quad (17)$$
$$\text{s.t.} \begin{cases} \mu(f_2(x)) \leq D_{max} \\ \mu(f_3(x)) \geq I_{min} \end{cases}$$

wherein $U = [-1, -1, 1, 1]$, $V = \text{diag}(f_1(x), \alpha f_2(x), \beta f_3(x), f_4(x))$; $f_1(x) = x_1 + x_2 + \ldots + x_n$ represents a sum of all shots reserved; $f_2(x) = D_1 x_1 + D_2 x_2 + \ldots + D_n x_n$ represents a sum of every shot duration time, and $D_i$ denotes a time length of the $i^{th}$ shot; $f_3(x) = I_1 x_1 + I_2 x_2 + \ldots + I_n x_n$ represents the shot importance, and $I_i$ denotes importance of the $i^{th}$ shot; a last component is donated as $f_4(x) = \sum_{i,j=1, i \neq j}^{n} \text{Sim}(S_i, S_j) \cdot x_i \cdot x_j$;

in a constraint, $\mu(\cdot)$ denotes normalization of a linear function; $D_{max}$ and $I_{min}$ denote a maximum length of a shot duration and a minimum significance of the shots respectively when the video summarization is generated; $\alpha$ and $\beta$ are control coefficients that meet $D_i = \alpha D_{max}$, $I_i = \beta I_{min}$; an objective function is given by $$u(F(x)) = \max \|\eta_i \cdot UV\|_1 \quad (18)$$

wherein $F(x) = (\mu(f_1(x)), \mu(f_2(x)), \mu(f_3(x)), \mu(f_4(x)))^T$; and $\eta_i$ is a weight value control coefficient of the objective function and meets $\eta_1 + \eta_2 + \eta_3 + \eta_4 = 1$ with non-negative $\eta_i$;

then the multi-view video summarization is optimized by solving x*:

$$x^* = \underset{x}{\arg\max}\, u(F(x)) \text{ s.t. } A \cdot F \leq \begin{pmatrix} D_{max} \\ -l_{min} \\ -u(F) \end{pmatrix} \quad (19)$$

$$\text{wherein } A = \begin{pmatrix} 0 & 1 & 0 & 0 \\ 0 & 0 & -1 & 0 \\ -1 & -1 & -1 & -1 \end{pmatrix}.$$

Preferably, the step 2-5) specifically comprises a step of building monitoring indexes COMI and SPEI by characteristic variables extracted from the multi-view video summarization;

wherein in view of a monitoring video in the different views, the video summarization is taken as common information of a surveillance video by a global multi-object optimization under the single view and the different views; then, video sets are obtained by extracting the important shots from the single view respectively, which will be regarded as information source of special parts of the monitoring video; wherein the monitoring indexes are defined as:

$$\text{COMI} = c^T \Lambda_c^{-1} c \quad (20)$$

$$\text{SPEI}_l = s_l^T \Lambda_l^{-1} s_l,\ l=1,2,3 \quad (21)$$

wherein c is a vector of common information feature variables, and $s_l$ is a vector of special information feature variables at a $l^{th}$ single view; $\Lambda_c$ and $\Lambda_l$ are variance of modeling data about multi-view common video information and special video information respectively.

Preferably, the cameras are CCD (charge-coupled device) cameras.

Preferably, the multi-view-based fault diagnosis method used for analyzing the video information is stored in the chip of the control center.

Fault diagnosis device based on multi-view method has shown good performance in the process monitoring by using industrial video information. At the same time, the feature variables extracted by the multi-view video summarization method can effectively compress the raw video data and solve the problem that the video information is complicated and difficult to deal with. This solves the trouble of using the video information for online monitoring. Moreover, the constructed optical flow potential and the acceleration potential provide the possibility of predicting the occurrence of faults. All in all, the fault diagnosis device designed can solve the detection and diagnosis problems of furnace eruption fault and furnace leaking fault in the smelting process, effectively.

These and other objectives, features, and advantages of the present invention will become apparent from the following detailed description, the accompanying drawings, and the appended claims.

DETAILED DESCRIPTION OF THE PREFERRED EMBODIMENT

Embodiment 1: a fault diagnosis device based on common information and special information of running video information for an EFMF (electrical fused magnesia furnace).

For the smelting process, we know that the strong coupling between the multi-source interference and the conventional monitoring variables due to the complex field conditions often makes process monitoring results of EFMF difficult to be satisfactory. Therefore, video information as process variables will be intended to solve the above difficulties. In order to obtain the above process data, we designed the following process monitoring device, as shown in FIG. 2.

Figure 1:
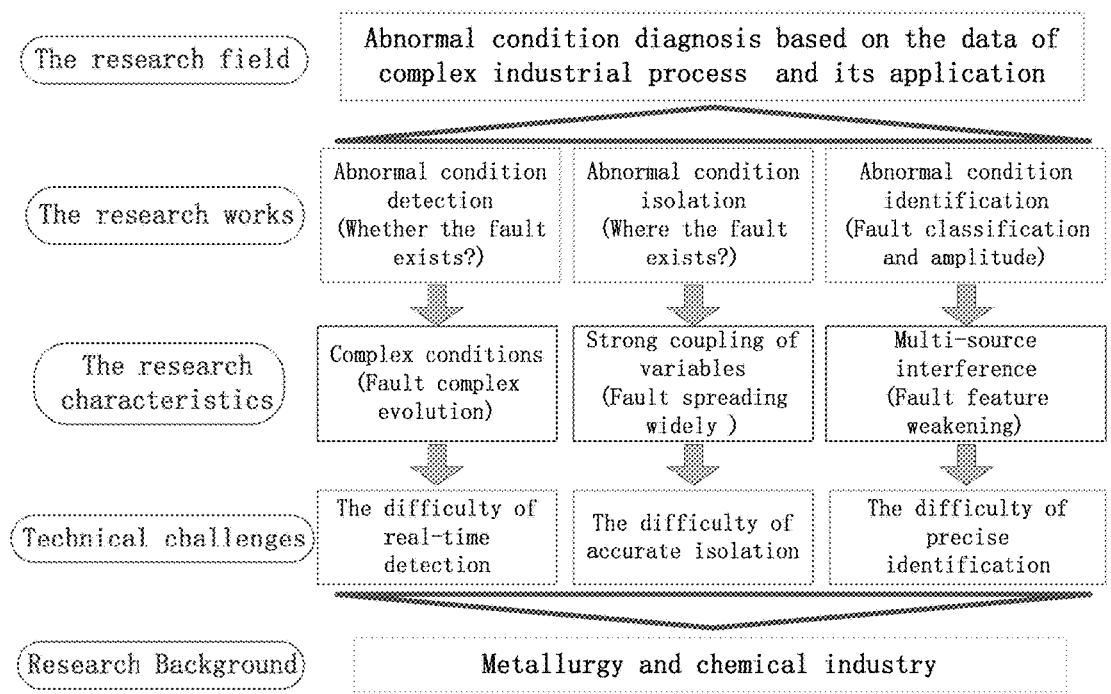
FIG. 1 illustrates fault diagnosis research contents and applications description.
Figure 2:
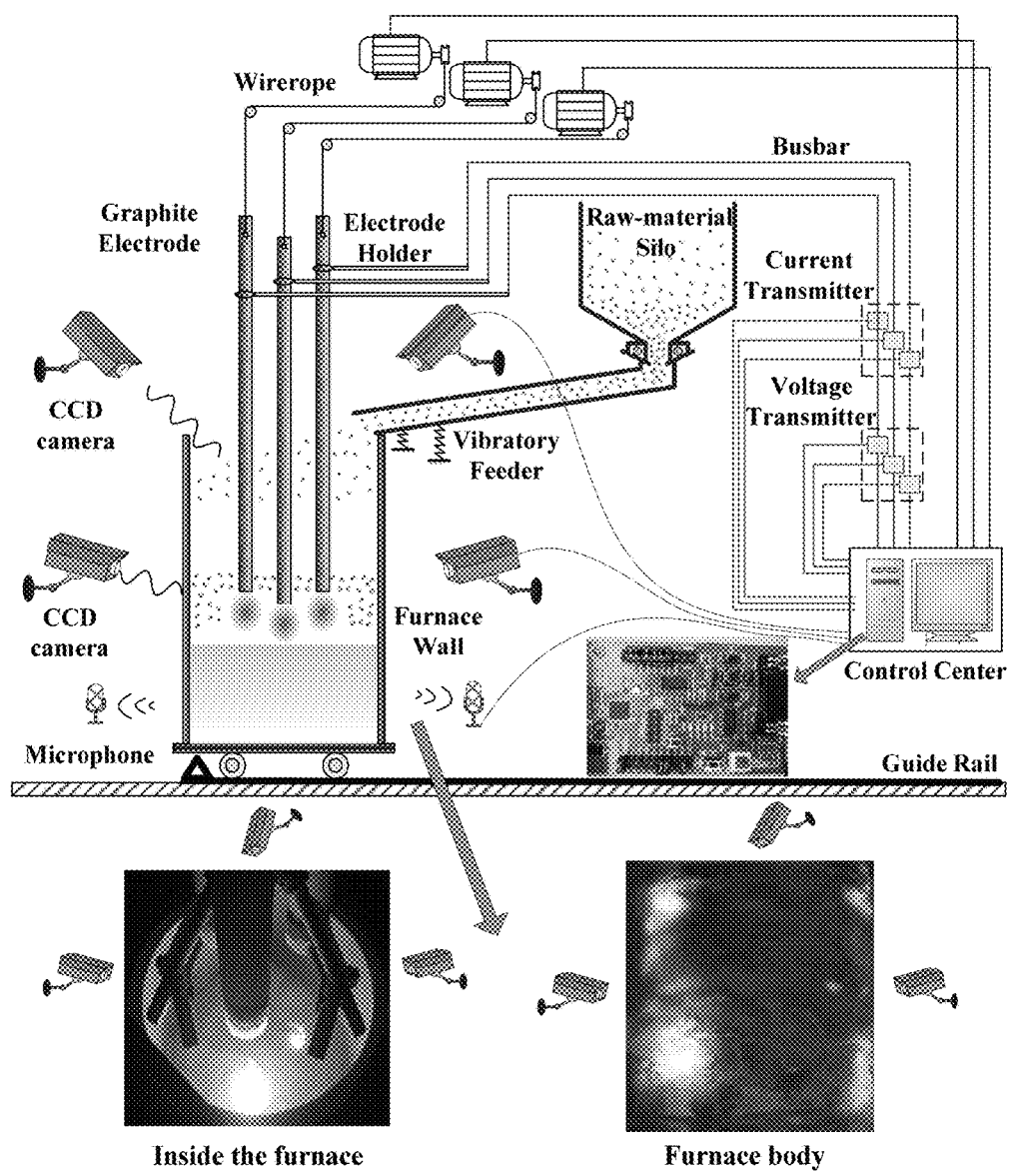
FIG. 2 shows a multi-view monitoring illustration.

According to FIG. 2, in order to use the video data information better, the multi-view method is introduced into the device so as to omni-directional acquisition of the video information. It is well known that the furnace eruption fault of EFMF generally occurs at the superposition area of electrode arc heat, and the furnace leaking fault usually occurs at the arc of the electrode. Therefore, it is necessary to accurately and effectively monitor the smelting operation state near the electrode area. The way to achieve multi-view approach is to place a CCD camera at the relative position of the three electrodes above the EFMF respectively as shown in the FIG. 2 to monitor the furnace eruption fault, so that the dead zones in each camera can be monitored complementarily. And the three CCD cameras are symmetrically arranged around the furnace body by a 120 degree difference to monitor the occurrence of furnace leaking fault. The real-time video surveillance image at the electrode and the surface of the furnace can be seen in FIG. 2. Eventually, the video information obtained by the six CCD cameras will be collected into the control center and further called in the process of online detection and fault diagnosis. The called data will be applied to the fault diagnosis method based on the multi-view monitoring approach in the control center so as to finish the tasks of the processing, analysis and judgment of the monitoring data. Finally, according to the corresponding monitoring indexes, we can determine the running state of the EFMF and then guide the production. In addition, the data information after the analysis will be displayed in FIG. 3 through the host computer interface of control center.

Figure 3:
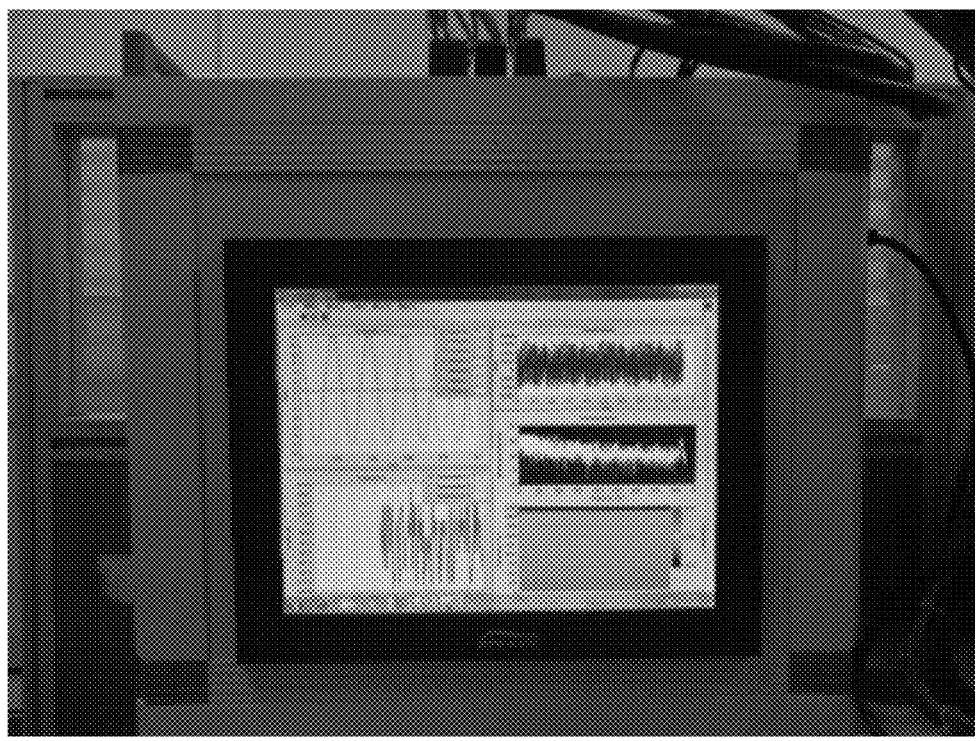
FIG. 3 illustrates a host computer interface of a fault diagnosis device.
Figure 4:
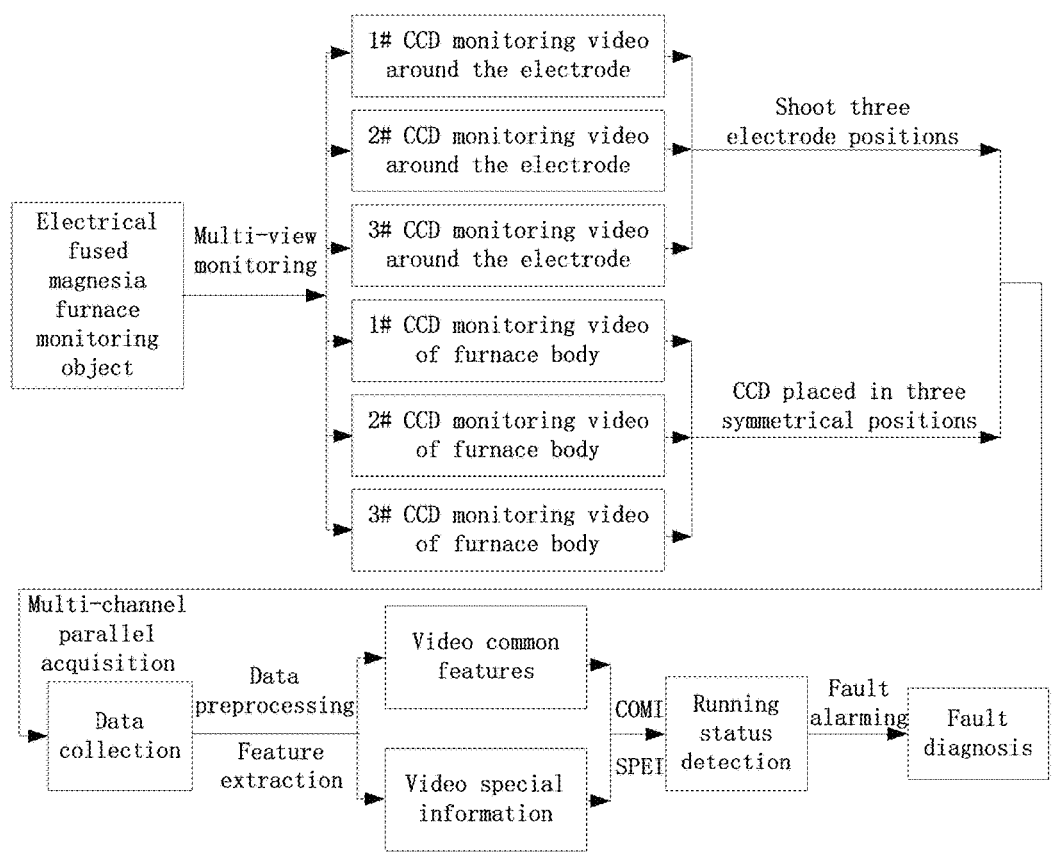
FIG. 4 is a fault diagnosis device monitoring block diagram.

In FIG. 3, we can visually see the information obtained by the algorithm processing video data embedded in the device. The multi-view-based fault diagnosis method applied is stored in the chip of the control center, and the chip is shown in FIG. 2. The specific fault diagnosis process is illustrated in FIG. 4, which can be just regarded as structure block diagram of fault diagnosis device using the video information. From FIG. 4, we can see that after real-time multi-channel parallel acquisition of multiple CCD camera video information, we need to preprocess the raw data according to the corresponding method and further extract interested data features. According to FIG. 4, the fault diagnosis device designed can analyze the collected data by common information (COMI) and special information (SPEI) statistics in the common characteristics and special information sections of the video information, which aims to achieve the running state detection of EFMF and fault diagnosis when the fault occurs.

Figure 5:
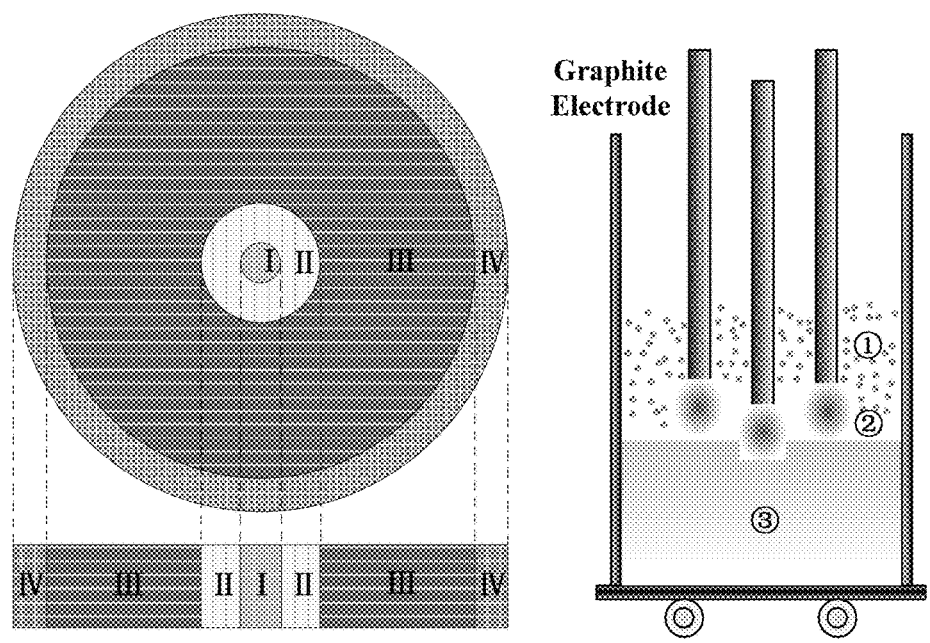
FIG. 5 illustrates EFMF smelting surface and furnace wall area division.

The CCD camera monitoring location has been roughly introduced hereinbefore, and the CCD camera monitoring location settings will be explained in accordance with the fused magnesia smelting crystal structure and smelting work area division in the following. In FIG. 5, according to the crystalline state of fused magnesia finished product and melting state of materials during the smelting process in the furnace, the EFMF is divided into the following fused magnesia melting crystalline structure and the smelting workspace on the basis of the horizontal direction and perpendicular to the horizontal direction respectively. In the horizontal direction, furnace surface is divided into four regions from the center to the circumference of a circle, namely, I Impurity area, II Equiaxed crystal area, III Columnar crystal area and IV Leather sand layer area. Since the area I is located in the magnetic field overlap region where the three electrode alternating currents form, the arc generated by the electrode under the action of the ampere force will be far away from this area. Therefore, it is difficult to ensure that the raw material is sufficiently melted. However, the area II is closer to the arc and the temperature is relatively higher. The separated impurities by smelted fully in this area will move to the region I under the influence of the gas or move to the center under the extrusion of the first solidified magnesia, and then the final impurities will be formed in the area I. In addition, due to the gas and other dust from the decomposition of magnesite moving to the center area during the smelting process, it is easy to make the internal pressure increase causing the furnace eruption fault when the gas and other dust are covered by the raw material without smelting fully. The areas II and III are the final product areas obtained after the end of the production. Since the temperature of the area III is relatively constant at the center of electrode smelting heat, the magnesia crystals obtained are ideal; The area II is in the high temperature region and during the cooling crystallization, due to the internal heat of melting magnesia, equiaxed crystal takes shape caused by the lack of the required crystallization temperature difference, which we would not like to see. The ratio of columnar crystals to equiaxed crystals can be changed by temperature control or by changing the radius of the furnace. On account of the lower temperature at the edge of furnace, the magnesium carbonate cannot be completely melted. So the leather sand is consisted of magnesium carbonate without melting and silica migrating outward produced during smelting process in the area IV. Therefore, in order to monitor the occurrence of the furnace eruption fault and real-time acquire fused magnesia smelting state, and then to get a higher proportion of columnar crystals, corresponding cameras are placed above the furnace and around the electrode. In the direction perpendicular to the horizontal plane, the furnace in the smelting process can be divided into ① Raw material layer, ② Smelting layer and ③ Crystal cooling layer from top to bottom. In these three parts, the temperature of the smelting layer is the highest and the most prone to danger. Layers ① and ② keep rising with the electrode lifting during the smelting process. In the process of electrode lifting, it is likely that the electrode is from the center position to near the furnace wall bringing about furnace leaking fault. Therefore, for fault alarming on the furnace timely, monitoring the furnace body in the vertical direction is also needed.

Fault diagnosis device based on multi-view method has carried on the detailed introduction hereinbefore. Then a description of multi-view-based fault diagnosis method needs giving in the following.

Embodiment 2: a fault diagnosis method based on common information and special information of running video information for an EFMF.

Multi-view technology is method which shoots the same scene from different viewpoints and then extracts the same shots or shots with more associated information. This can obtain all-round video image information in a plane so as to avoid blind spots. However, for continuous monitoring video, storage and analysis have been already a relatively troublesome problem. Then extraction and analysis of the monitoring video information from multiple cameras on the same scene are more complicated and difficult. In order to simplify the difficulty of analysis and improve the real-time performance of video data analysis, multi-view video summarization technology is introduced into the present invention, so that industrial process monitoring based on running video information can be realized. So, the multi-view video summarization technology will be explained in detail in this section.

We first introduce the method of shots segmentation and then we demonstrate the entropy model to evaluate the importance of shots. Next, the similarity of shots in multi-view is detailed in order to facilitate the similar shots cluster. Later we implement the multi-objective optimization to select the most representative shots to generate the finial multi-view video summarization. Last but not least, we can build the monitoring indexes for fault detection and diagnosis.

Shots Segmentation:

The first step in the video summarization extraction process is shot segmentation. In the present invention, we use the method of grayscale histogram via comparing the difference between the two consecutive frame histograms.

Entropy Model:

The evaluation of the shot importance is an important part of multi-view video summarization because the importance of the shot often contains more useful information of the event. Generally speaking, static or low-activity shots can be defined as unimportant shots. In this part, we compute a set of characteristic values for each shot and then consider color, texture, and motion vector information. Finally, we represent them via entropy to evaluate the shot importance.

Color Histogram: In this issue, it is in order to represent the importance of the shots that we decide to obtain the color histogram information using the HSV color space to describe the color entropy, because it is found to be more robust to small color changes of the multi-view camera.

For a frame f with N color values, the probability of appearance of the $i^{th}$ color value in the image is $P_i$, thus the color entropy is defined as:

$$E_{HSV}(f) = \sum_{i=1}^{N} p_i \log(1/p_i) \tag{1}$$

Where $\sum_{i=1}^{N} p_i = 1$ and $p_i \geq 0$.

Edge Direction Histogram: These texture features are extracted using edge direction histogram descriptor. The sobel operator is selected to calculate the edge direction of each pixel. The image space is separated by four lines: horizontal, vertical, 45°, and 135°. As a result, the image is divided into eight bins on the center point of the image. Then the edge direction information is gathered and the edge direction histogram is obtained. Next, the information entropy $E_{EDGE}(f)$ can be calculated based on edge direction histogram of each frame.

Motion-related Feature Vector: When the moving object changes in the same scene, it will lead to the pixels' changes. In this part, the motion entropy is defined based on the gray-scale histogram and some appropriate improvements on the gray-scale entropy of the image are carried on. Let $V(t,k)$ represent the $k^{th}$ bin grey value of the color histogram of the frame t, where $0 \leq k \leq 127$. Its motion-related feature vector can be represented by the histogram difference between frame t and its previous frame t−1, which is determined as $$V(\Delta t, k) = |V(t, k) - V(t-1, k)| \quad (2)$$

$$E_{motion} = \sum_{k=1}^{127} p\{k | V(\Delta t, k)\} \log \frac{1}{\{k | V(\Delta t, k)\}} \quad (3)$$

According to different video contents and the user's needs, while emphasizing the impact of useful information, the entropy fusion model is applied to deal with the entropy. Taking into account the different entropy on the impact of the results, different weights ω are chosen to merger of different types of entropy:

$$E_{com}(f) = \omega_1 E_{HSV}(f) + \omega_2 E_{edge}(f) + \omega_3 E_{motion}(f) \quad (4)$$

and $\omega_i$ meets: $\omega_1 + \omega_2 + \omega_3 = 1$.

Thus the important frame set can be obtained:

$$F_{imp}(\text{Video}) = \{f_{i1}, f_{i2}, \ldots, f_{in}\} \quad (5)$$

Then we can obtain the entropy score of each frame. Generally speaking, the higher the score is, the more information that the frame contains. The entropy with a high score can be defined by the threshold to retain, that is, the important frame. The definition of entropy score is as follow:

$$\gamma = \frac{E_i(f) - \min E_i(f)}{\max E_i(f) - \min E_i(f)} \geq \text{Threshold} \quad (6)$$

Where γ is the entropy score. It can be customized according to user requirements, and the range value of the threshold is in the interval $[0,1]$. $E_i(f)$ represents the entropy of the $i^{th}$ frame, max $E_i(f)$ and min $E_i(f)$ represent the maximum and minimum values of all entropies separately. The frame whose values are greater than the threshold will be retained.

Finally, the important shot $S_{imp}$ is defined as follows:

$$S_{imp} = Int(f_{i1}, f_{i2}, \ldots, f_{io}) \quad (7)$$

where $Int(\cdot)$ is the integration operation to combine the important frames which belong to the same shot. Thus we obtain the important shots.

The similarity of shots in multi-view:

A considerable part of shots above reflect similar events. Therefore, these shots should be clustered together by calculating their value of similarity. For the multi-view videos, each shot correlates closely with not only the temporally adjacent shots in its view but also the shots in other views. The calculation of the similarity of shots includes the similarity of shots in mono-view and the correlation of shots in different views.

The similarity of the shots in mono-view can be measured by two indexes: temporal adjacency and visual similarity. In particular, temporal adjacency refers that two shots are likely to reflect the same event if they are temporally adjacent to each other and therefore they tend to have a high degree of similarity. Here we define:

$$d_T(T_i, T_j) = \alpha_1 + \alpha_2 |T_i - T_j| + \alpha_3 |T_i - T_j|^2 \quad (8)$$

Where $T_i$ and $T_j$ respectively denote the time of the middle frames of the $i^{th}$ and $j^{th}$ shots along the time axis in the same view. $\alpha_1$, $\alpha_2$ and $\alpha_3$ are the control coefficient.

In terms of visual similarity, the color histogram and the edge direction histogram are applied to measure the correlation of the shots. Further Euclidean distance is used to measure the difference between two color histograms and two edge direction histograms separately. Suppose k be the $k^{th}$ bin of the histogram, then:

$$d_H(H_i, H_j) = \sqrt{\sum_{k=0}^{n} (H_i(k) - H_j(k))^2} \quad (9)$$

$$d_G(G_i, G_j) = \sqrt{\sum_{k=0}^{m} (G_i(k) - G_j(k))^2} \quad (10)$$

Where $H_i(k)$ and $H_j(k)$, respectively, denote the color histogram of the $k^{th}$ bin in the $i^{th}$ and $j^{th}$ frame, $H_i(k)-H_j(k)$ denotes the difference of the color histogram between the two corresponding bins k. And $G_i(k)$, $G_j(k)$ denote the edge direction histogram of the $k^{th}$ bin in the $i^{th}$ and $j^{th}$ frame respectively, $G_i(k)-G_j(k)$ denote the difference of the edge direction histogram between the two corresponding bins k.

Finally, combine the temporal adjacency and the visual similarity to obtain the similarity of the shots under the same view, namely:

$$\text{Diff}(i, j) = \gamma_1 d_T(T_i, T_j) + \gamma_2 d_H(H_i, H_j) + \gamma_3 d_G(G_i, G_j) \quad (11)$$

$$\text{MonoSim}(i, j) = e^{-\frac{\text{Diff}(i,j)^2}{2\sigma^2}} \quad (12)$$

Where, $\gamma_1, \gamma_2, \gamma_3$ are the regularization parameter and then by setting the threshold, the similar shots can be obtained under the same view.

Principle component analysis-scale invariant feature transform (PCA-SIFT) algorithm is used to measure the correlation of the shots in different views. It has been confirmed that SIFT features have the characteristic of scale invariance, even if the rotation angle, image brightness or shooting angle are changed, and it can still get a good detection effect. Therefore, it is suitable to find the similar shots in different views. The PCA-SIFT algorithm can effectively reduce the dimensionality while preserving the good characteristics of SIFT.

We randomly select n frames from each of the similar shots in each view for PCA-SIFT detection. Through the feature vector generated by the key points in each frame, we get the descriptor of each frame, and then the Euclidean distance d of the feature vectors is considered as the similarity determination measure between the two frames to obtain the correlation degree of the shots under different views. Assuming that V is the selected shot in one view and S is the shot to be compared in another view, thus the distance between the two shots can be measured by:

$$d(S, V) = \frac{1}{n}\sum_{i=1}^{n}\min_{f_i \in V, g \in S}[d(f_i, g)] \tag{13}$$

where n is the number of frames in V·g and $f_i$ are frames from S and V respectively.

With this presentation, the correlation of the shots in different views can be transformed into the problem to find a shot $\bar{S}$ with minimum Euclidean distance between the feature vectors:

$$\bar{S} = \arg\min_{S}[d(S, V)] \tag{14}$$

Thus the correlation of shots in different views can be defined as follow:

$$MultiSim(S, V) = e^{-\frac{d(S,V)^2}{2\sigma^2}} \tag{15}$$

Finally, the similar shots (including the same view and different views) are gathered to form similar shot cluster. Similar shot cluster can be finished by K-means clustering algorithm.

The Multi-Objective Optimization:

An ideal video summarization is expected to present as much video shot information as possible with the shortest summary duration and the minimum number of shots. At the same time, the most representative shot of the different views in the multi-view video is selected to present in the one video summarization. Therefore, we need to adopt the multi-objective optimization model to make the obtained multi-view video summarization as good as possible.

Suppose a given decision vector $x=(x_1, x_2, \ldots, x_n)$, and it meets:

$$x_i = \begin{cases} 1, & \text{shot } i \text{ is reserved} \\ 0, & \text{shot } i \text{ is not reserved} \end{cases} \tag{16}$$

The multi-objective optimization function is given by $$\max UV \tag{17}$$
$$\text{s.t.} \begin{cases} \mu(f_2(x)) \leq D_{max} \\ \mu(f_3(x)) \geq I_{min} \end{cases}$$

Where $U=[-1,-1, 1, 1]$, $V=\text{diag}(f_1(x), \alpha f_2(x), \beta f_3(x), f_4(x))$. $f_1(x)=x_1+x_2+\ldots+x_n$ represents the sum of all shots reserved. $f_2(x)=D_1 x_1+D_2 x_2+\ldots+D_n x_n$ represents the sum of every shot duration time, and $D_i$ denotes the time length of the $i^{th}$ shot. $f_3(x)=I_1 x_1+I_2 x_2+\ldots+I_n x_n$ represents the importance of the shot, where the greater the value is, the more information the multi-view video summarization covers, and $I_i$ denotes the importance of the $i^{th}$ shot. And the last one can be donated as $f_4(x)=\sum_{i,j=1, i \neq j}^{n} \text{Sim}(S_i, S_j) \cdot x_i \cdot x_j$.

In the constraint, $\mu(\cdot)$ denotes normalization of the linear function. $D_{max}$ and $I_{min}$ denote the maximum length of shot duration and the minimum significance of the shots respectively when the video summarization is generated. $\alpha$ and $\beta$ are the control coefficient that meet $D_i=\alpha D_{max}$, $I_i=\beta I_{min}$. The objective function is given by $$u(F(x))=\max\|\eta_i \cdot UV\|_1 \tag{18}$$

Where $F(x)=(\mu(f_1(x)),\mu(f_2(x)),\mu(f_3(x)),\mu(f_4(x)))^T$. And $\eta_i$ is the weight value control coefficient of the objective function and meets $\eta_1+\eta_2+\eta_3+\eta_4=1$ with non-negative $\eta_i$.

Then the multi-objective optimization above can be transformed into the 0-1 mixed integer programming problem and we can get the result of the optimization by solving the $x^*$:

$$x^* = \arg\max_{x} u(F(x)) \text{ s.t. } A \cdot F \leq \begin{pmatrix} D_{max} \\ -I_{min} \\ -u(F) \end{pmatrix} \tag{19}$$

$$\text{in which } A = \begin{pmatrix} 0 & 1 & 0 & 0 \\ 0 & 0 & -1 & 0 \\ -1 & -1 & -1 & -1 \end{pmatrix}.$$

According to the results, the shot in the shot cluster can be either reserved or abandoned so as to obtain the multi-view video summarization with less number and shorter length of the shots but contains more fully video information in the result.

Fault Detection and Diagnosis:

In accordance with the ideal multi-view video summarization, we can build monitoring indexes COMI and SPEI by characteristic variable extracting from the video summarization.

In view of the monitoring video in different views, the video summarization is taken as the common information of surveillance video by the global multi-object optimization under the single view and different views. Then, the video sets are obtained by extracting the important shots from the single view respectively, which will be regarded as information source of the special parts of monitoring video. Because there is a dead zone for each view in the monitoring process, it is significant to make use of the special information of single view to compensate the common information of the global video summarization. According to this idea, we construct the following monitoring indicators as:

$$\text{COMI}=c^T \Lambda_c^{-1} c \tag{20}$$

$$\text{SPEI}_l=s_l^T \Lambda_l^{-1} s_l, l=1,2,3 \tag{21}$$

Where c is a vector of common information feature variables, and $s_l$ is a vector of special information feature variables at the $l^{th}$ single view. Moreover, $\Lambda_c$ and $\Lambda_l$ are the variance of modeling data about multi-view common video information and special video information respectively.

Embodiment 3: experiment results.

Magnesia is a kind of refractory material widely used in the field of metallurgical industry, glass industry, cement industry, household heater, chemical industry and so on. EFMF is one of the most widely used production device in the fused magnesia industry. In order to guarantee the normal operation of the EFMF, we must ensure its safety. If there is any fault during normal operation, the performance of control system could get severe damage, even lead to the breakdown of the entire system and enormous loss, when the fault will not be able to timely adjust or alarm. Therefore, the fault detection and diagnosis of EFMF is imperative.

Figure 6:
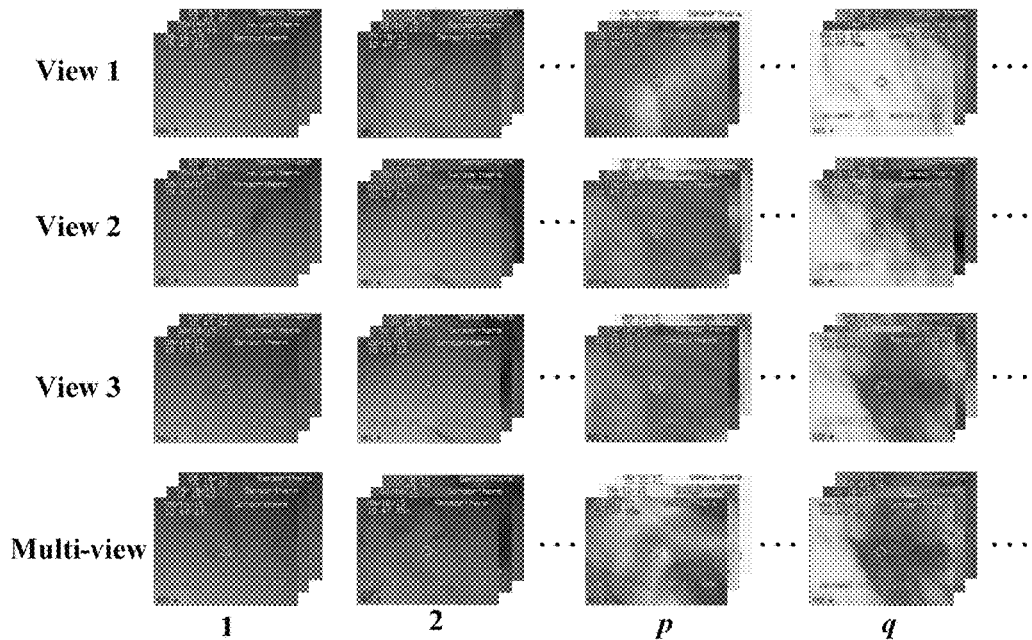
FIG. 6 shows important shot sets extracted by multi-view method.

In the monitoring process, we select one of the most important shots belonging to time for a second video as a sample, and each shot consists of three frames of image. According to the monitoring indexes, we can obtain video summarization samples in single view and multi-view. As illustrated in FIG. 6, three single views of 1#, 2# and 3# CCD cameras are selected as the compensation information of multi-view video. And p, q denote the $p^{th}$, $q^{th}$ monitoring sample, simultaneously seen as fault sample in FIG. 6.

After obtaining the above four video sets, we extract eight texture features, seven Hu moment invariants, optical flow potential and acceleration potential from four video sets, totally seventeen variables. Since the three images within a shot change little, we compute the mean of three-frame image texture feature and Hu moment invariants feature as the first 15 variables in the shot features. In addition, we define the 2-norm of the optical flow field between the two images as the optical flow potential, and define the 2-norm of the acceleration field among the three images as the acceleration potential simultaneously. Similar to the above, we make the average of optical flow potential corresponding to image within the two shots and the average of acceleration potential corresponding to image within the three shots as the last two variables of shot characteristics. Therefore, in order to obtain the optical flow potential and the acceleration potential, it is necessary to obtain two pre-sampling shots before monitoring.

Figure 7:
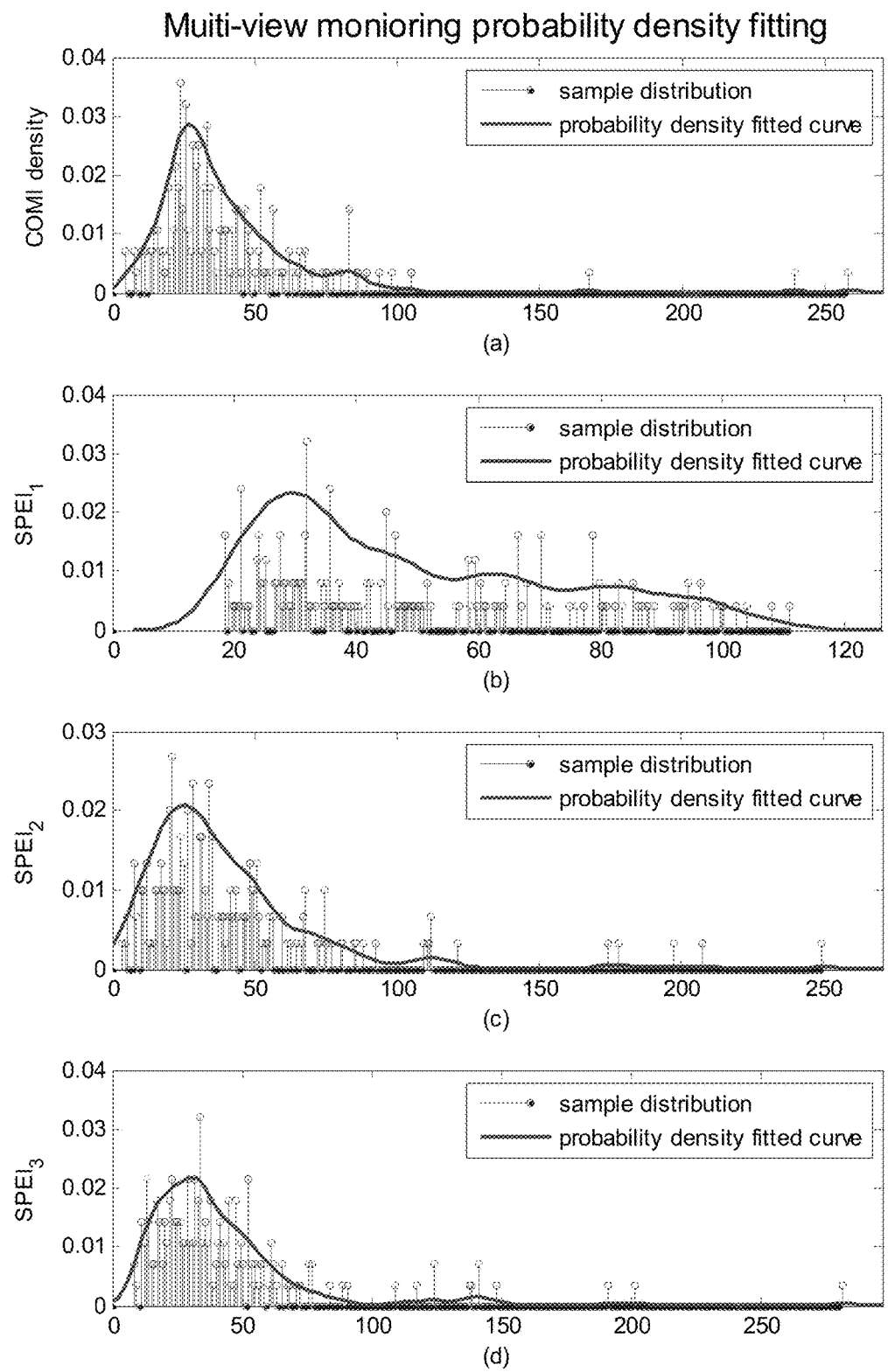
FIG. 7 is multi-view monitoring probability density fitting curves.

First of all, we use the fault diagnosis device designed to detect the furnace eruption fault. In this process, 200 seconds of the normal running video are selected as the original modeling video data, 200 important shots are screened at single views and multi-view respectively, and then 200 sets of process variables are extracted as modeling samples corresponding to the four video sets. Next, 200 seconds of the original video are selected to extract 200 sets of process variables as the test data sets at single views and multi-view respectively, where furnace eruption fault occurs continuously. Furthermore, the modeling datasets extracted are standardized and calculated to obtain the collection of monitoring indexes according to the equations (20) and (21). And we carry out the probability statistics of the monitoring indexes of modeling data and carry on the kernel density fitting to the density function of the monitoring indexes. The probability density fitting curves of the monitoring indexes obtained from the multi-view method is shown in FIG. 7. According to FIG. 7, we can know that control limitations of 95% confidence bound are respectively 100, 118, 105 and 122 corresponding to statistics COMI and $SPEI_l$ (l=1, 2, 3).

Figure 8:
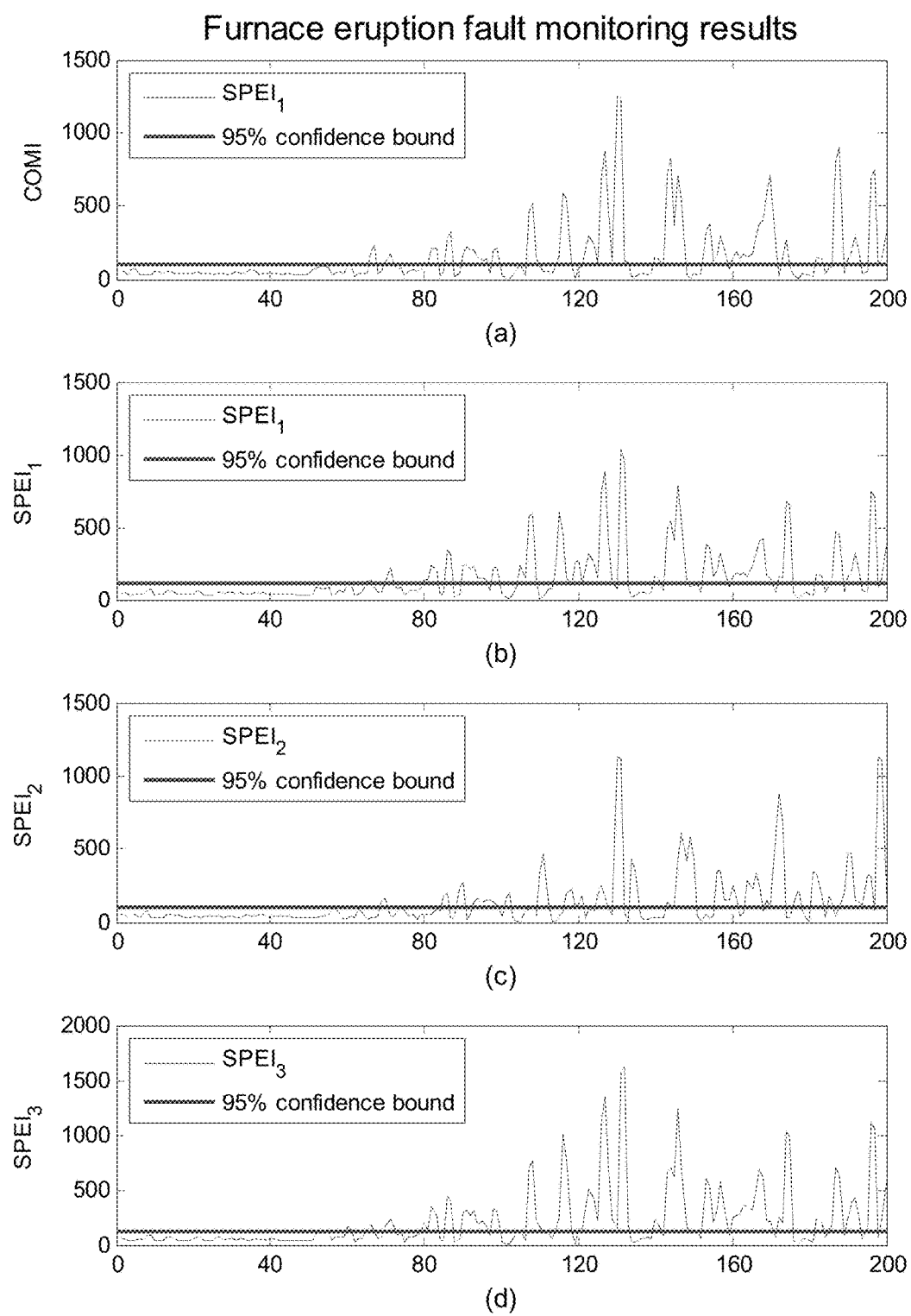
FIG. 8 shows furnace eruption fault monitoring results.

Based on the control limitations obtained from the probability density analysis of the modeling data, the detecting results of the test data are shown in FIG. 8. In FIG. 8, we find that the change trends in the detection results of (a), (b) and (d) are similar to each other in general. At the $66^{th}$ sample point, the fault occurs continuously. And the system can be adjusted by itself to make the fault trend within controllable range among 66 seconds and 100 seconds. The furnace first appears more obvious trend of the furnace eruption fault at $108^{th}$ second, after this, the state of the system exceeds the safety critical point, and the furnace eruption fault of more energy occurs more often. In FIG. 8, we find that the furnace eruption faults occurring always disappear soon, due to the strong surface tension of the molten magnesia and the decreasing in pressure after the release. In addition, the change of (c) is lagging behind the other three images obviously, indicating that the change at (c) is caused by (b) and (d), and then it can be judged that the furnace eruption fault occurs roughly between 1# and 3# CCD camera monitoring position. Therefore, through the analysis of FIG. 8, we find that whether the fault occurs or not can be judged according to the multi-view statistic COMI, and then the general location of the fault can be determined by the statistic SPEI.

Figure 9:
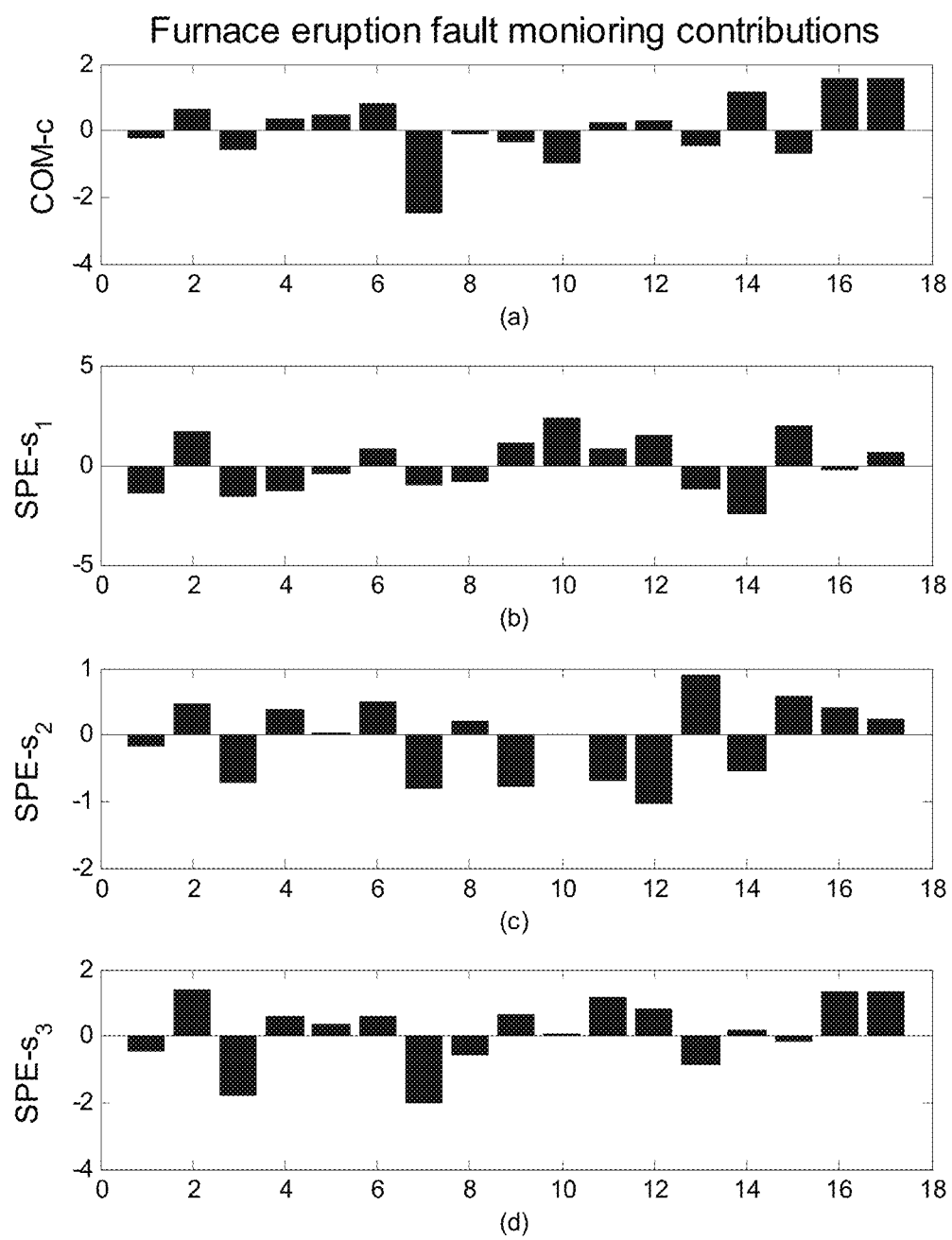
FIG. 9 is a furnace eruption fault monitoring contributions plot.

FIG. 8 has shown that the fault diagnosis device designed is effective for the discovery of the fault. Next, we analyze the fault contributions of the $131^{th}$ sample point with the largest monitoring amplitude in FIG. 8. The variable fault contributions of the $131^{th}$ sample point are shown in FIG. 9, and the variable values are obtained through normalizing according to the expectation and variance of the modeling data. In the figure, we find that the characteristic variables of the 3# special information are similar to the characteristic variables of common information roughly. Therefore, it can be considered that the monitoring range of 3# camera is the significantly main fault occurrence area. In addition, we conclude that it is bigger that the variable contributions of the optical flow potential and acceleration potential are about variables COM–c and $SPE-s_3$, which indirectly describes the importance of constructing these two characteristic variables. And also illustrates that a large part of the fault severity changes can be reflected by the video flow field and the acceleration field.

Figure 10:
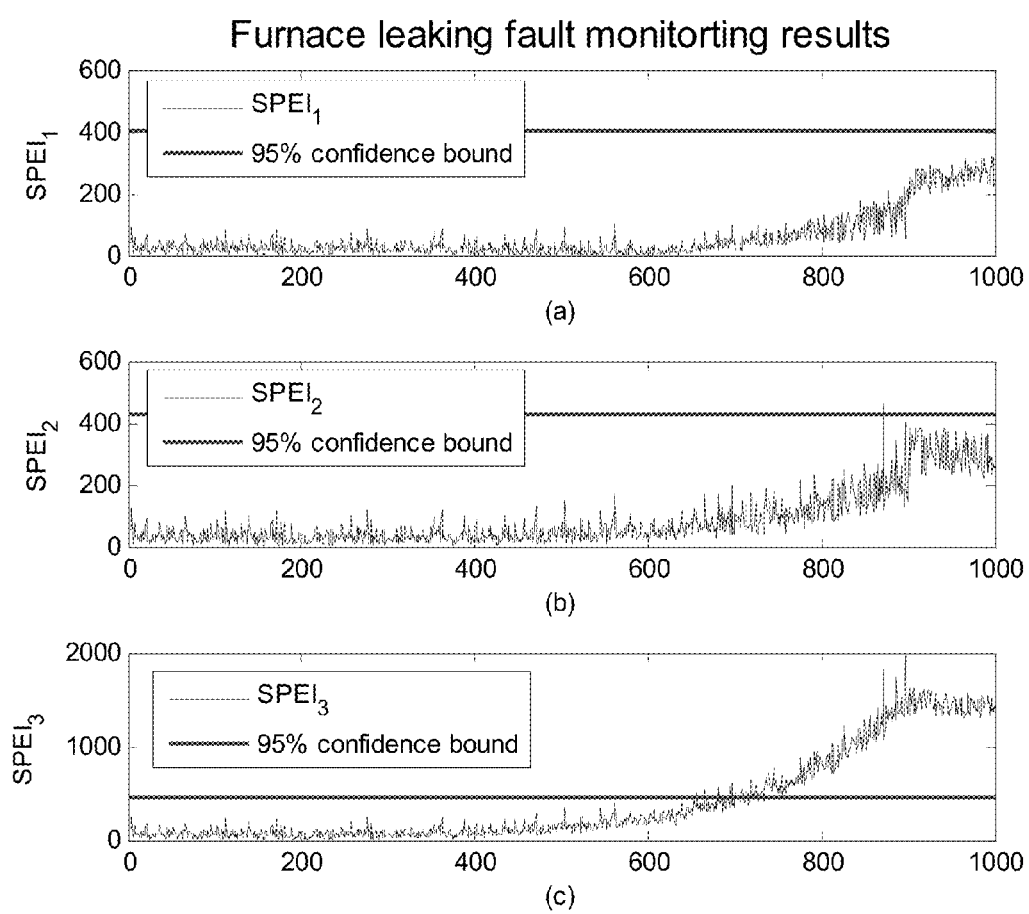
FIG. 10 illustrates furnace leaking fault monitoring results.

For the monitoring of the furnace leaking fault, the three cameras overlap mutual information are little in the furnace monitoring process, so we do not consider the common part of the video summarization information, and only use their respective single view to monitor the furnace leaking fault at the electrode. In the process of identifying fault, we assume that when the large bright incandescent yellow spot appears on the furnace wall, the furnace leaking fault occurs. As a result of the acquisition of the furnace leaking fault control limitation and the analysis of variable fault contribution plot consistent with the analysis of furnace eruption fault, the simulation detecting plot of the furnace leaking fault is only given here, shown in FIG. 10. In the experiment, we select 200 seconds of normal condition monitoring video to model, and then apply 1000 seconds video containing the furnace leaking fault to test. Same to the furnace eruption fault, the control limitations of 95% confidence bound about statistics $SPEI_l$ (l=1, 2, 3) are 405, 432 and 458 respectively. As shown in FIG. 10, 1# and 2# view points do not contain faults, but 3# point appears the fault at the $718^{th}$ sampling point and has been maintained all the time. Besides, three monitoring indexes are in a substantial increase after the $600^{th}$ second, indicating that all three electrodes have a tendency closing to the furnace wall or the currents continue to increase. Accordingly, the production site can check the corresponding electrode location and current output and then avoid the risk of furnace leaking fault under the tendency of monitoring indexes in a substantial increase.

The above simulation experiments, furnace eruption fault and furnace leaking fault do not happen at the same time, however, they may also unfortunately occur at the same time in the actual production. Therefore, it is necessary to detect and anticipate the occurrence of faults in a timely and effective manner. The experimental results demonstrate that the fault diagnosis device designed has good performance for the fault detection, and the optical flow potential and the acceleration potential introduced need to consider the previous variable information, so it is helpful to predict the occurrence of the fault.

Fault diagnosis device based on multi-view method has shown good performance in the process monitoring by using industrial video information. At the same time, the feature variables extracted by the multi-view video summarization method can effectively compress the raw video data and solve the problem that the video information is complicated and difficult to deal with. This solves the trouble of using the video information for online monitoring. Moreover, the constructed optical flow potential and the acceleration potential provide the possibility of predicting the occurrence of faults. All in all, the fault diagnosis device designed can solve the detection and diagnosis problems of furnace eruption fault and furnace leaking fault in the smelting process, effectively.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A fault diagnosis method based on common information and special information of running video information for an EFMF (electrical fused magnesium furnace), comprising steps of:
   1) arranging six cameras, wherein three of the six cameras are respectively arranged at relative positions of three electrodes above the EFMF and aim at the electrodes of the EFMF, so as to monitor a furnace eruption fault; rest of the six cameras are symmetrically arranged around a furnace body by a 120 degree difference and aim at the furnace body, so as to monitor occurrence of a furnace leaking fault;
   2) obtaining video information by the six cameras and sending the video information to a control center; then analyzing the video information by a chip of the control center; wherein in order to simplify a difficulty of analysis and improve a real-time performance of video data analysis, multi-view video summarization technology is introduced, so that industrial process monitoring based on running video information is able to be realized; specifically, a multi-view-based fault diagnosis method is used by the chip, comprising steps of:
      2-1) comparing a difference between two consecutive frame histograms for shots segmentation;
      2-2) computing a set of characteristic values for each shot obtained by the step 2-1), and then computing color, texture, and motion vector information; finally, evaluating shot importance via entropy;
      2-3) clustering shots together by calculating similarity, wherein calculation of the similarity of the shots comprises the similarity of the shots in a mono-view and correlation of the shots in different views;
      2-4) generating and optimizing a multi-view video summarization with a multi-objective optimization model; wherein the shot in the shot cluster is either reserved or abandoned so as to obtain the multi-view video summarization with a less number and a shorter length of the shots but contains more fully video information; and
      2-5) providing fault detection and diagnosis; and
   3) displaying results of the fault detection and diagnosis on a host computer inter face of the control center.

2. The fault diagnosis method, as recited in claim 1, wherein the step 2-2) specifically comprises a step of computing the color information by a color histogram;
   wherein an HSV (hue, saturation and value) color space is used to obtain color histogram information, so as to describe color entropy, wherein:
   for a frame f with N color values, a probability of appearance of a $i^{th}$ color value in an image is $P_i$, thus the color entropy is defined as:

$$E_{HSV}(f) = \sum_{i=1}^{N} p_i \log(1/p_i) \tag{1}$$

wherein $\Sigma_{i=1}^{N} p_i = 1$ and $p_i \geq 0$.

3. The fault diagnosis method, as recited in claim 2, wherein the step 2-2) specifically comprises a step of computing the texture information by an edge direction histogram;
   wherein texture features are extracted using edge direction histogram descriptor; a sobel operator is selected to calculate an edge direction of each pixel; an image space is separated by four lines: horizontal, vertical, 45°, and 135°, in such a manner that the image is divided into eight bins on a center point of the image; then an edge direction information is gathered and an edge direction histogram is obtained; information entropy $E_{EDGE}(f)$ is calculated based on the edge direction histogram of each frame.

4. The fault diagnosis method, as recited in claim 3, wherein the step 2-2) specifically comprises a step of computing the motion vector information by a motion-related feature vector;
   wherein V(t,k) is used to represent a $k^{th}$ bin grey value of the color histogram of a frame t, where $0 \leq k \leq 127$; a motion-related feature vector is represented by a histogram difference between the frame t and a previous frame t−1, which is determined as $$V(\Delta t, k) = |V(t, k) - V(t - 1, k)| \tag{2}$$

$$E_{motion} = \sum_{k=1}^{127} p\{k \mid V(\Delta t, k)\} \log \frac{1}{\{k \mid V(\Delta t, k)\}}. \tag{3}$$

5. The fault diagnosis method, as recited in claim 4, wherein the step 2-2) specifically comprises a step of evaluating the shot importance via the entropy;
   wherein an entropy fusion model is applied to deal with the entropy, and different weights ω are chosen to merger of different types of the entropy:

$$E_{com}(f) = \omega_1 E_{HSV}(f) + \omega_2 E_{edge}(f) + \omega_3 E_{motion}(f) \tag{4}$$

wherein $\omega_i$ meets: $\omega_1 + \omega_2 + \omega_3 = 1$;
thus an important frame set is obtained:

$$F_{imp}(\text{Video}) = \{f_{i1}, f_{i2}, \ldots, f_{in}\} \tag{5}$$

then an entropy score of each frame is obtained; wherein the entropy with a high score is defined by a threshold to retain, which indicates important frames; a definition of the entropy score is as follows:

$$\gamma = \frac{E_i(f) - \min E_i(f)}{\max E_i(f) - \min E_i(f)} \geq \text{Threshold} \qquad (6)$$

wherein γ is the entropy score and the threshold is customized according to user requirements, and a range value of the threshold is in an interval [0,1]; $E_i(f)$ represents the entropy of the $i^{th}$ frame, max $E_i(f)$ and min $E_i(f)$ represent a maximum value and a minimum value of all entropy separately; the frame whose values are greater than the threshold is retained;

finally, important shots $S_{imp}$ are defined as follows:

$$S_{imp} = Int(f_{i1}, f_{i2}, \ldots, f_{i\alpha}) \qquad (7)$$

wherein Int(·) is an integration operation to combine the important frames of a same shot, so as to obtain the important shots.

6. The fault diagnosis method, as recited in claim 5, wherein in the step 2-3), the similarity of the shots in the mono-view is measured by two indexes: a temporal adjacency and a visual similarity; specifically, the temporal adjacency refers that two shots are likely to reflect a same event, which is defined as:

$$d_T(T_i, T_j) = \alpha_1 + \alpha_2 |T_i - T_j| + \alpha_3 |T_i - T_j|^2 \qquad (8)$$

wherein $T_i$ and $T_j$ respectively denote a time of middle frames of the $i^{th}$ and $j^{th}$ shots along a time axis in a same view. $\alpha_1$, $\alpha_2$ and $\alpha_3$ are control coefficients;

wherein correlation of the shots are measured by the color histogram and the edge direction histogram; a further Euclidean distance is used to measure a difference between two color histograms and two edge direction histograms separately; if k is the $k^{th}$ bin of the histogram, then:

$$d_H(H_i, H_j) = \sqrt{\sum_{k=0}^{n} (H_i(k) - H_j(k))^2} \qquad (9)$$

$$d_G(G_i, G_j) = \sqrt{\sum_{k=0}^{m} (G_i(k) - G_j(k))^2} \qquad (10)$$

wherein $H_i(k)$ and $H_j(k)$, respectively, denote the color histogram of the $k^{th}$ bin in the $i^{th}$ and $j^{th}$ frame, $H_i(k)-H_j(k)$ denotes a difference of the color histogram between the two corresponding bins k; and $G_i(k)$, $G_j(k)$ denote the edge direction histogram of the $k^{th}$ bin in the $i^{th}$ and $j^{th}$ frame respectively, $G_i(k)-G_j(k)$ denote a difference of the edge direction histogram between the two corresponding bins k;

finally, the temporal adjacency and the visual similarity are combined to obtain the similarity of the shots under the same view, namely:

$$\text{Diff}(i,j) = \gamma_1 d_T(T_i, T_j) + \gamma_2 d_H(H_i, H_j) + \gamma_3 d_G(G_i, G_j) \qquad (11)$$

$$\text{MonoSim}(i,j) = e^{-\frac{\text{Diff}(i,j)^2}{2\sigma^2}} \qquad (12)$$

wherein, $\gamma_1$, $\gamma_2$, $\gamma_3$ are regularization parameters.

7. The fault diagnosis method, as recited in claim 6, wherein in the step 2-3), the correlation of the shots in the different views is measured by a principle component analysis-scale invariant feature transform (PCA-SIFT) algorithm;

wherein n frames are randomly selected from each of the similar shots in each view for PCA-SIFT detection; through the feature vector generated by key points in each frame, the descriptor of each frame is obtained, and then the Euclidean distance d of the feature vector is considered as a similarity determination measure between the two frames to obtain a correlation degree of the shots under the different views; assuming that V is a selected shot in one view and S is a shot to be compared in another view, thus the distance between the two shots is be measured by:

$$d(S, V) = \frac{1}{n} \sum_{i=1}^{n} \min_{f_i \in V, g \in S} [d(f_i, g)] \qquad (13)$$

wherein n is a number of frames in V; g and $f_i$ are frames from S and V respectively;

the correlation of the shots in the different views is transformed into a problem to find a shot $\overline{S}$ with minimum Euclidean distance between the feature vectors:

$$\overline{S} = \arg\min_{S} [d(S, V)] \qquad (14)$$

thus the correlation of shots in the different views is defined as follows:

$$\text{MultiSim}(S, V) = e^{-\frac{d(S,V)^2}{2\sigma^2}} \qquad (15)$$

finally, the similar shot are gathered to form a similar shot cluster, wherein the similar shot cluster is finished by a K-means clustering algorithm.

8. The fault diagnosis method, as recited in claim 7, wherein in the step 2-4), a given decision vector $x=(x_1, x_2, \ldots, x_n)$ is provided, which meets:

$$x_i = \begin{cases} 1, & \text{shot } i \text{ is reserved} \\ 0, & \text{shot } i \text{ is not reserved} \end{cases} \qquad (16)$$

a multi-objective optimization function is given by $$\max UV \qquad (17)$$
$$\text{s.t.} \begin{cases} \mu(f_2(x)) \leq D_{max} \\ \mu(f_3(x)) \geq I_{min} \end{cases}$$

wherein $U=[1-, -1, 1, 1]$, $V=\text{diag}(f_1(x), \alpha f_2(x), \beta f_3(x), f_4(x))$; $f_1(x)=x_1+x_2+\ldots+x_n$ represents a sum of all shots reserved; $f_2(x)=D_1x_1+D_2x_2+\ldots+D_nx_n$ represents a sum of every shot duration time, and $D_i$ denotes a time length of the $i^{th}$ shot; $f_3(x)=I_1x_1+I_2x_2+\ldots+I_nx_n$ represents the shot importance, and $I_i$ denotes importance of the $i^{th}$ shot; a last component is donated as $f_4(x)=\Sigma_{i,j=1, i\neq j}^{n} \text{Sim}(S_i, S_j) \cdot x_i \cdot x_j$;

in a constraint, $\mu(\cdot)$ denotes normalization of a linear function; $D_{max}$ and $I_{min}$ denote a maximum length of a shot duration and a minimum significance of the shots respectively when the video summarization is generated; α and β are control coefficients that meet $D_i=\alpha D_{max}$, $I_i=\beta I_{min}$; an objective function is given by $$u(F(x))=\max\|\eta_i \cdot UV\|_1 \quad (18)$$

wherein $F(x)=(\mu(f_1(x)),\mu(f_2(x)),\mu(f_3(x)),\mu(f_4(x)))^T$; and $\eta_i$ is a weight value control coefficient of the objective function and meets $\eta_1+\eta_2+\eta_3+\eta_4=1$ with non-negative $\eta_i$;

then the multi-view video summarization is optimized by solving x*:

$$x^* = \underset{x}{\operatorname{argmax}}\, u(F(x))\ \text{s.t.}\ A \cdot F \le \begin{pmatrix} D_{max} \\ -I_{min} \\ -u(F) \end{pmatrix} \quad (19)$$

$$\text{wherein } A = \begin{pmatrix} 0 & 1 & 0 & 0 \\ 0 & 0 & -1 & 0 \\ -1 & -1 & -1 & -1 \end{pmatrix}.$$

9. The fault diagnosis method, as recited in claim 8, wherein the step 2-5) specifically comprises a step of building monitoring indexes COMI and SPEI by characteristic variables extracted from the multi-view video summarization;

wherein in view of a monitoring video in the different views, the video summarization is taken as common information of a surveillance video by a global multi-object optimization under the single view and the different views; then, video sets are obtained by extracting the important shots from the single view respectively, which will be regarded as information source of special parts of the monitoring video; wherein the monitoring indexes are defined as:

$$\text{COMI}=c^T \Lambda_c^{-1} c \quad (20)$$

$$\text{SPEI}_l=s_l^T \Lambda_l^{-1} s_l,\ l=1,2,3 \quad (21)$$

wherein c is a vector of common information feature variables, and $s_l$ is a vector of special information feature variables at a $l^{th}$ single view; $\Lambda_c$ and $\Lambda_l$ are variance of modeling data about multi-view common video information and special video information respectively.

10. The fault diagnosis device, as recited in claim 9, wherein the cameras are CCD (charge-coupled device) cameras.

11. The fault diagnosis device, as recited in claim 10, wherein the multi-view-based fault diagnosis method used for analyzing the video information is stored in the chip of the control center.

* * * * *